US006507790B1

(12) United States Patent
Radomski (10) Patent No.: US 6,507,790 B1
(45) Date of Patent: Jan. 14, 2003

(54) ACOUSTIC MONITOR

(75) Inventor: James V. Radomski, New Brighton, MN (US)

(73) Assignee: Horton, Inc., Roseville, MN (US)

( * ) Notice: Subject to any disclaimer, the term of this patent is extended or adjusted under 35 U.S.C. 154(b) by 0 days.

(21) Appl. No.: 09/115,898

(22) Filed: Jul. 15, 1998

(51) Int. Cl.[7] .................................................. G01B 5/28
(52) U.S. Cl. ........................................... 702/39; 702/42
(58) Field of Search ..................... 702/39, 42; 364/508, 364/550; 324/628; 181/224; 367/141

(56) References Cited

U.S. PATENT DOCUMENTS

| | | | |
|---|---|---|---|
| 3,127,767 A | | 4/1964 | Kamp |
| 3,694,637 A | | 9/1972 | Edwin et al. |
| 4,423,634 A | | 1/1984 | Audenard et al. |
| 4,437,163 A | | 3/1984 | Kurihara et al. |
| 4,550,603 A | | 11/1985 | Fukada et al. |
| 4,550,604 A | | 11/1985 | Sugimoto et al. |
| 4,758,964 A | * | 7/1988 | Bittner et al. ............... 364/508 |
| 4,768,380 A | | 9/1988 | Vermeiren et al. |
| 4,951,271 A | * | 8/1990 | Garrett et al. .............. 356/477 |
| 4,959,638 A | | 9/1990 | Palmer |
| 4,988,979 A | | 1/1991 | Sasaki et al. |
| 5,001,931 A | | 3/1991 | Nishimoto et al. |
| 5,224,170 A | | 6/1993 | Waite, Jr. |
| 5,532,603 A | * | 7/1996 | Bottman ..................... 324/628 |
| 5,572,443 A | * | 11/1996 | Emoto et al. ............... 364/550 |
| 5,663,535 A | * | 9/1997 | MacDonalds et al. ...... 181/224 |
| 5,804,728 A | * | 9/1998 | Beall et al. ................... 73/598 |
| 6,195,438 B1 | * | 2/2001 | Yumoto et al. ............. 381/103 |

OTHER PUBLICATIONS

The Digital Filter Analyzer Comes of Age, Sound and Vibration, pp. 32–35, Mar. 1988.
Quest Electronics, Model 261 Sound Level Detector/Controller, Sep. 1992.
A Multitrate Bank of Digital Bandpass Filters for Acoustic Applications, Hewlett–Packard Journal, pp. 73–81 Apr. 1993.
Digital Filtering A computer Laboratory Textbook, Georgia Institute of Technology, pp. 203–206, 1994.

* cited by examiner

Primary Examiner—John S. Hilten
Assistant Examiner—Tung S Lau
(74) Attorney, Agent, or Firm—Kinney & Lange P.A.

(57) ABSTRACT

An electronic monitor is disclosed which continuously monitors the sound emanating from rotating machinery, non-rotating equipment, or any other sound-producing process or environment, as a means of detecting abnormalities and thus determining the operating condition thereof. The monitor continuously computes the power spectrum of the monitored sound and has two modes of operation: learn and operate. The monitor is placed in the learn mode during a time when the machine or process to be monitored is known to be operating normally. During the learn mode, the maximum and minimum acoustic power output from each of a plurality of digital bandpass filters is continuously maintained and updated in data memory as the acoustic signature of the machine or process being monitored. During the operate mode, the monitor continuously compares the real-time filter outputs with the acoustic signature stored during the learn mode and activates a panel lamp and relay if the output of any of the bandpass filters deviates from the upper or lower decibel limits of the acoustic signature by more than the setting of the corresponding front panel sensitivity selector switch. In its preferred form, the monitor is capable of storing and utilizing up to five acoustic signatures, selectable by either an operator or a host controller, with the signatures being stored in non-volatile data memory. Two alarm levels are provided by the monitor: warning, to indicate a developing fault, and danger, to indicate a situation requiring immediate corrective action.

15 Claims, 2 Drawing Sheets

ACOUSTIC MONITOR

FIELD OF THE INVENTION

This invention generally relates to the field of monitoring a sound source for determining its operating condition, particularly relates to the fields of machinery condition monitoring, acoustics, and digital signal processing, and specifically relates to the real-time digital filtering of an acoustical signal to obtain its power spectrum, and the comparison of the power spectrum with a previously determined baseline spectrum as a means of detecting developing machinery faults.

BACKGROUND OF THE INVENTION

There has been commercial activity in the field of machinery condition monitoring for at least 25 years, almost all of it based on either periodic or continuous measurement of machine vibration. Acoustic monitoring has rarely been used for detecting machinery faults, even though sound and vibration are closely related. A rotating or reciprocating machine, for example, produces dynamic forces (forces which are rapidly changing functions of time) which cause various parts of the machine to vibrate. These vibrations also cause sound to be radiated from the machine. The relationship between the dynamic forces acting within a machine and the sound radiating from the machine is complex. The vibration spectrum (the displacement amplitude as a function of frequency) depends on the measurement location on the machine, as well as the orientation of the vibration transducer with respect to the axis of rotation of the machine. The sound spectrum (the acoustic power as a function of frequency) depends on the orientation of the microphone with respect to the machine, the directional characteristics of the microphone, and the acoustical characteristics of the surrounding objects and structures. The point of origin of a vibration component may not be an efficient radiator of sound; nevertheless, it is still possible to hear this vibration component if it is transmitted to another part of the machine which is mechanically resonant at that frequency. The design of the machine, and especially the damping characteristics of the materials used, greatly affects the intensity and spectral distribution of the radiated sound.

A machine which is in good condition and functioning properly will have a certain vibration spectrum, which in turn will generate a certain sound spectrum, that is, an acoustic signature which can be used as a reference or baseline. In general, the vibration spectrum and the sound spectrum are not the same; in fact, they may be quite different. But, if the condition of the machine deteriorates, or if there is a sudden failure, the vibration spectrum, and therefore the sound spectrum, will change. The deteriorating machine condition can be detected by continuously monitoring the sound coming from the machine, computing the power spectrum, and comparing the power spectrum to the baseline spectrum stored in memory. If the real-time power spectrum deviates from the baseline spectrum by more than a predetermined amount, an alarm can be activated, along with automatic shutdown of the monitored machine, if desired.

There are many types of machine faults that could be detected by such a monitor; for example, rotating imbalance, reciprocating imbalance, misaligned or bent shafts, damaged rolling element bearings, damaged journal bearings, damaged or worn gears, broken drive belts or chains, mechanical looseness, jamming, overloading, friction, windage, impacts, explosions, and escaping air, water, or steam. An acoustic monitor could also provide protection for non-rotating equipment such as boilers, electrical transformers, and flow processes.

The art and science of vibration-based machinery condition monitoring is highly developed, and there are many commercially available products for measuring vibration, and for collecting, storing, analyzing, and displaying vibration data. In recent years, there has been a significant increase in activity in this field because of the widespread availability of digital signal processing (DSP) hardware such as DSP microcomputers. These are high speed single-chip computers which incorporate a high degree of operational parallelism and which are designed to implement computationally intense DSP algorithms such as the fast Fourier transform (FFT), widely used to compute the power spectrum of a vibration signal. Vibration analysis techniques have been developed to detect and diagnose specific machine faults, using commercially available hardware and software tools. The usual approach is to measure vibration with an accelerometer which is in direct contact with the machine being monitored or studied, and then process the resulting signal with an instrument known as a dynamic signal analyzer (DSA). This equipment is expensive, the placement and orientation of accelerometers on the machine can be critical, and skilled personnel are required to operate the DSA and correctly interpret the resulting vibration spectra.

With regard to the early detection of machinery problems, in many cases the first indication of trouble is the sound that a machine makes. In fact, it may be argued that acoustic monitoring (by human observers) is the oldest form of machinery condition monitoring in existence. Experienced machine operators or plant maintenance personnel can often recognize that a machine is in distress because they are familiar with what the machine sounds like when it is operating normally. An acoustic monitor could, in effect, replace human observers in situations where machinery is operating in remote, inaccessible, or hazardous locations, or any other situation where machinery requires continuous monitoring. The acoustic monitor according to the teachings of the present invention is intended to be affordable, dependable, easy-to-use, and easy-to-install and has, as its purpose, machinery protection rather than machinery fault diagnosis or testing. Once the user has been alerted to the fact that machinery is in distress, more sophisticated equipment can be used to diagnose the specific problem. It is not necessary to continuously monitor the machinery with costly vibration-based instrumentation.

DESCRIPTION OF THE PRIOR ART

At the present time, there is only one commercially available product known to be capable of continuous acoustic monitoring of industrial processes and equipment: the Model 261 Sound Level Detector/Controller, manufactured by Quest Electronics of Oconomowoc, Wis. This product is essentially a sound level measuring instrument with an output relay having an adjustable threshold calibrated in decibels (dB). It measures the root-mean-square (RMS) sound pressure level (SPL) sensed by a microphone and actuates a relay if the threshold setting is exceeded. Other than providing the A and c frequency weighting commonly used for sound level measurements, this product does not perform any type of filtering or spectral analysis. It is a broadband instrument which simply measures the combined effect of all the frequency components of a signal. Primarily intended for industrial hygiene purposes (noise control and warning), it can also be used to provide an alarm signal or automatically shut down a machine if the sound pressure level exceeds the threshold setting.

SUMMARY OF THE INVENTION

An acoustic monitor according to the teachings of the present invention is a self-contained system which detects faults in the operating condition by continuously analyzing the sound produced by the sound source being monitored and comparing the resulting power spectrum to a previously recorded "acoustic signature" used as a baseline. In the preferred form, the acoustic monitor performs real-time $\frac{1}{12}$th octave digital bandpass filtering over an eight octave range (midband frequencies of 33.108 Hertz to 8,000 Hertz) and computes the acoustic power output, in decibels, of each of the resulting 96 bandpass filters. Fractional octave bandpass filtering produces a constant percentage bandwidth analysis, that is, the bandwidth of each bandpass filter is a constant percentage of its midband frequency. In the case of a $\frac{1}{12}$th octave bandpass filter, the bandwidth is always 5.78 percent of the midband frequency. This type of spectrum analysis is widely used in the field of acoustics, as opposed to the constant bandwidth FFT analysis preferred for vibration measurements. In terms of signal processing, the acoustic monitor according to the teachings of the present invention functions in exactly the same way as an instrument known as a digital filter analyzer. The digital filters conform to American National Standard S1.11-1986 "Specification for Octave-Band and Fractional-Octave-Band Analog and Digital Filters". The use of digital filters in the acoustic monitor according to the teachings of the present invention, as opposed to analog filters, is highly desirable for three reasons: (1) Analog implementation of the 96 bandpass filters described herein would require a very large number of precision resistors, capacitors, and operational amplifiers, (2) Component aging and drift would cause the filter characteristics to change over time and temperature, and (3) It is easy to control, simulate, and modify, if necessary, the characteristics of digital filters implemented in software.

The acoustic monitor according to the teachings of the present invention has two modes of operation: learn and operate. Before protection can be provided, the monitor must be placed in a learn mode for a period of time so it can "learn" what the sound source sounds like when the sound source is known to be operating properly. The monitor can remain in the learn mode for a few minutes, several hours, or even days, but it must be a long enough time for the acoustic monitor to experience all of the sounds which normally occur in the environment in which the sound source is located. During the learn mode, the maximum and minimum acoustic power output from each one of the 96 bandpass filters is continuously maintained and updated in data memory as the acoustic signature of the sound source being monitored. In this manner, the alarm limits are automatically established, without requiring the judgment and experience of a skilled operator. A copy of the acoustic signature is also maintained in non-volatile memory (NVM) which preserves the data whenever the acoustic monitor is powered down. While in the learn mode, the acoustic signature is written to NVM every ten minutes. It is also written to NVM whenever the front panel mode switch is changed from LEARN to OPERATE. The NVM copy of the acoustic signature cannot be continuously updated because the electrically erasable programmable read-only memory (EEPROM) used for this purpose in the preferred form typically has an endurance of no more than one million write cycles. Thus, an electrical power interruption during the learn mode would cause, at most, ten minutes of data to be lost. Operator intervention is required to continue in the learn mode after power is restored. This is to prevent the acoustic monitor from powering up unexpectedly in the learn mode and corrupting an acoustic signature which is already stored in NVM.

During the operate mode, the acoustic monitor of the preferred form of the present invention continuously compares the real-time filter outputs with the acoustic signature previously stored during the learn mode and activates a panel lamp and relay if the output of any of the 96 bandpass filters deviates from the upper or lower decibel limits of the acoustic signature by more than the setting of the corresponding front panel sensitivity selector switch. There are two alarm settings: warning and danger. The warning and danger levels, in decibels, can be set independently and can be individually configured for either latching or non-latching alarm operation, using front panel switches. A latching alarm remains active until the clear button is pressed or a valid signal is received at the remote clear terminal, even if the machinery or similar sound source returns to normal operation. A non-latching alarm is automatically deactivated if the machinery or similar sound source returns to normal. During non-latching operation, both alarms employ hysteresis to prevent relay chatter when slowly changing sounds are encountered.

In the preferred form, the acoustic power output of each bandpass filter is computed by squaring its output and time-averaging the result, because the energy in a wave is proportional to the square of its amplitude. The response time of the averaging filters can be adjusted from 1 to 1000 seconds, using a front panel selector switch. The response time is defined as the time required for the filter outputs to settle to within one percent of their final value after a step change in acoustic power. Note that this is not necessarily equal to the length of time it takes for the acoustic monitor to respond to an operating condition fault. It is merely another way of specifying the transient response of a first-order system (response time=4.605 time constants). Selecting the appropriate response time for the application will enable the acoustic monitor to respond to an operating condition fault within a reasonable length of time, while ignoring short-term background noise events.

The acoustic monitor according to the teachings of the present invention allows the user to record and utilize up to five acoustic signatures. This multiple acoustic signature capability is designed for monitoring applications that involve more than one acoustical "phase of operation". That is, the sound radiating from a sound source may not be continuous in nature, but may be characterized as having several distinct regions of operation, each having its own acoustic signature. For example, an automated test stand which uses sound to detect product defects could perform up to five types of tests, each producing a different acoustic signature. However, the acoustic monitor cannot automatically recognize which test is being performed or what phase of operation a sound source is engaged in because, without additional information, the acoustic monitor could interpret the normal sound during one phase of operation as an abnormal condition of another phase of operation. During the operate mode, the acoustic monitor must receive a command from either an operator or a host controller, such as a programmable logic controller (PLC), to change acoustic signatures. The command can be given manually, using the front panel clear button, or by a host controller which sends an appropriately timed pulse through the monitor's remote clear terminal.

During both the learn and operate modes, the acoustic monitor according to the teachings of the present invention continuously computes the real-time power spectrum of the sound sensed by the microphone. The power spectrum of a signal is valuable information that is widely used in the field of acoustics, and the ability to view it in real time represents a powerful capability which traditionally has been very expensive. The acoustic monitor according to the teachings of the present invention has terminals which allow the user to view a graphical display of the following important data with the aid of an ordinary oscilloscope: (1) The real-time power spectrum of the acoustic signal, (2) The upper decibel limit of the stored acoustic signature, and (3) The lower decibel limit of the stored acoustic signature. A trigger signal is also provided by the acoustic monitor to facilitate external triggering of the oscilloscope. In each case, the display is in the form of a step graph which simultaneously shows the time-averaged acoustic power outputs of all 96 digital bandpass filters used to measure the power spectrum of the signal. Even the most basic oscilloscope has two channels, allowing simultaneous display of the upper and lower decibel (dB) limits which constitute the acoustic signature. All three graphical displays incorporate horizontal (time) and vertical (voltage) markers which allow the user to easily adjust out any inaccuracies in oscilloscope calibration. The horizontal scale is calibrated in octaves (a logarithmic measure of frequency) and the vertical scale is calibrated in decibels (a logarithmic measure of acoustic power), consistent with practices in the field of acoustics. In its preferred form, the acoustic monitor according to the teachings of the present invention consists of two components: the control unit and the microphone unit. The control unit contains the power supply, digital signal processor, EPROM boot memory, non-volatile memory, A/D converter, D/A converter, lamp/relay driver, switches, indicator lamps, relays, and screw terminals, packaged in a DIN rail-mountable enclosure which meets international safety standards. There are relay outputs that can be connected to an annunciator panel and others that can be used to control the machinery or process being monitored.

The microphone unit contains a microphone, along with analog signal conditioning circuitry, housed in a compact, rugged enclosure suitable for use in an industrial environment. The control unit and microphone unit are connected by a 4-conductor shielded cable which supplies DC power to the signal conditioning circuitry inside the microphone unit, is while sending the amplified microphone signal in differential form back to the control unit for digital processing. This configuration yields the maximum signal-to-noise ratio in electrically noisy industrial environments.

A main object of the invention is to provide a new and improved acoustic monitor for monitoring and evaluating sounds emitted by a sound source wherein the acoustic monitor is the type which computes the spectrum of the monitored sound, and wherein the acoustic monitor has a learning mode wherein a sound spectrum of a monitored sound source is computed and stored as a signature spectrum and has an operating mode wherein the sound spectrum of a monitored sound source is computed continuously and compared with the stored signature spectrum, and any deviations therefrom of predetermined values are taken note of as a basis for possible corrective action.

This and further objects and advantages of the present invention will become clearer in light of the following detailed description of an illustrative embodiment of this invention described in connection with the drawings.

DESCRIPTION OF THE DRAWINGS

The preferred embodiment of the invention may best be described by reference to the accompanying drawings where.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "first", "second", "front", "upper", "lower", and similar terms are used herein, it should be understood that these terms have reference only to the structure shown in the drawings as it would appear to a person viewing the drawings and are utilized only to facilitate describing the illustrative embodiment.

DETAILED DESCRIPTION OF THE INVENTION

An electronic acoustic monitor for continuously monitoring sound produced by and emanating from a sound source for detecting abnormalities and thus determining the operating condition of the sound source according to the preferred teachings of the present invention is shown in the drawings. The sound source could include but is not limited to rotating machinery, non-rotating equipment, industrial processes, and environments.

Figure 1:
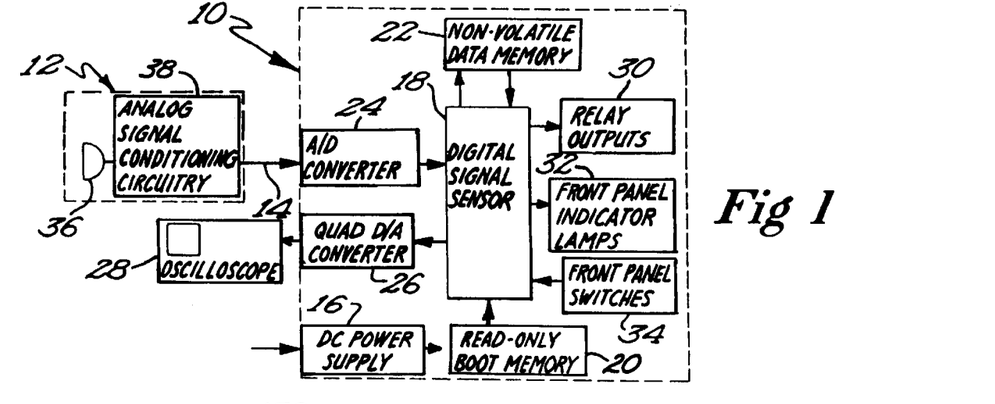
FIG. 1 is a functional block diagram showing the major hardware elements of the acoustic monitor, including a control unit which contains a power supply, digital signal processor, boot memory, non-volatile data memory, A/D converter, quad D/A converter, relay outputs, indicator lamps, and front panel switches; and a microphone unit which contains a microphone and signal conditioning electronics.

Referring to FIG. 1, a preferred embodiment of the monitor according to the preferred teachings of the present invention is shown including a control unit 10 and a remote microphone unit 12 connected together by a 4-conductor shielded cable 14 which in the most preferred form consists of two individually shielded twisted pairs with a common drain wire. Generally, control unit 10 contains a DC power supply 16, a digital signal processor 18, a read-only boot memory 20, a non-volatile data memory 22, an analog-to-digital converter 24, a quad digital-to-analog converter 26, relay outputs 30, front panel indicator lamps 32, and front panel switches 34.

In the preferred form, power supply 16 is a high-efficiency linear power supply which receives electrical power from the AC mains and produces a 5 volt DC output for use by both analog and digital circuitry. The AC input voltage in the most preferred form is switch-selectable to accommodate either 100–130 VAC or 200–260 VAC operation. The primary and secondary windings of the VDE-approved power transformer are fused and the dual primary windings are protected against differential mode voltage transients by metal-oxide varistors. The transformer employs an insulating shroud between the primary and secondary windings to provide excellent isolation and protection against common mode voltage transients. The full-wave bridge rectifier circuit employs Schottky barrier rectifiers to achieve the highest possible transformer utilization. The bridge rectifier output is filtered by a capacitor and fed to a low-dropout linear voltage regulator. The 5 volt regulated DC output is distributed to the circuitry using separate analog and digital power and ground planes on the processor circuit board.

In the preferred form, digital signal processor 18 is a 25 MHz ADSP-2101 DSP microcomputer manufactured by Analog is Devices, Inc. Processor 18 is a 16-bit, fixed-point, single-chip microcomputer optimized for DSP applications. When coming out of a valid reset condition, processor 18 copies machine language instructions from boot memory 20 to its on-chip program memory. After all of the instructions have been copied, processor 18 begins executing the instructions now residing in its program memory. Boot memory 20 is connected to processor 18 and in the preferred form is an industry-standard 27C128 16K×8 CMOS EPROM in either a one-time programmable or UV-erasable package.

Non-volatile data memory 22 can be read and written by processor 18 and in the preferred form is an industry-standard, four-wire serial interface 16,384-bit 93C86A CMOS EEPROM configured as 1,024 words×16 bits. Its function is to maintain a copy of the acoustic signature whenever the monitor is powered down.

Analog-to-digital converter 24 receives an analog signal from remote microphone unit 12 and outputs digital data to processor 18. Converter 24 in the preferred form is a 16-bit sigma-delta type of converter having differential voltage inputs and a serial data output compatible with the serial port of processor 18. This type of A/D converter has several inherent characteristics which can be advantageously employed by the present invention: (1) The differential analog inputs provide rejection of common-mode noise that may be capacitively or inductively coupled to cable 14 in an electrically noisy industrial environment, (2) The analog input is continuously oversampled at a very high rate by an analog modulator, thus eliminating the need for external sample-and-hold circuitry, (3) The modulator output is processed by two finite impulse response (FIR) digital filters in series, greatly reducing the complexity of the external anti-aliasing filter, and (4) The sample rate, digital filter corner frequency, and output word rate are proportional to the frequency of the clock signal supplied to A/D converter 24 by digital signal processor 18.

Quad digital-to-analog converter 26 receives digital data from processor 18 and outputs analog signals to an optional oscilloscope 28. In the preferred form, converter 26 consists of four individual 10-bit D/A converters which receive data from the serial port of processor 18 and which produce analog voltage outputs timed to generate graphical displays of data on optional oscilloscope 28. The four digital-to-analog converter (DAC) channels generate the following analog signals, available at the front panel screw terminals: (1) The real-time power spectrum of the acoustic signal, (2) The upper decibel limit of the stored acoustic signature, (3) The lower decibel limit of the stored acoustic signature, and (4) A trigger signal to facilitate external triggering of oscilloscope 28. After data has been written to the DAC registers, all four DAC outputs are updated simultaneously, thus assuring vertical alignment of the data displays on the screen of oscilloscope 28.

Relay outputs 30 can remotely signal the condition of the machine or process being monitored and also provide automatic shut-down, with lamps 32 showing the state of relay outputs 30. Panel switches 34 configure the acoustic monitor and control its operation.

Remote microphone unit 12 houses microphone 36 and analog signal conditioning circuitry 38 in a compact, heavy duty enclosure suitable for use in an industrial environment. In the preferred form, microphone 36 is of the electret condenser type, packaged in a rugged stainless steel housing with a sintered stainless steel sound port treated with water repellent. This particular microphone is designed to withstand severe temperature and humidity conditions, and it has a high resistance to mechanical shock. Microphone 36 is mounted inside a resilient foam windscreen which protects microphone 36 from dust and other contaminants and which also helps to isolate microphone 36 from vibration. Microphone 36 is connected to the circuit board containing signal conditioning circuitry 38 by means of a shielded cable. The most flexible cable available is used for this purpose to minimize the transmission of vibration from the circuit board to microphone 36. Electrical design, circuit board layout, grounding, and shielding are critical factors in the design of microphone unit 12 to minimize the introduction of electrical noise into the analog signal path.

In the preferred form, signal conditioning circuitry 38 amplifies the very low-level, single-ended voltage generated by microphone 36, converts the microphone voltage to a differential voltage, and drives cable 14. The power pair of cable 14 supplies remote microphone unit 12 with 5 volt DC power from control unit 10. The signal pair of cable 14 transmits the differential analog signal back to control unit 10 for digital processing. The voltage gain of signal conditioning circuitry 38 can be adjusted from 0 to 100 by means of a 25-turn trimming potentiometer, located on the circuit board in remote microphone unit 12. The following techniques have been employed to maximize the signal-to-noise ratio of the analog signal path: (1) Place all of the required amplification physically as close as possible to microphone 36, (2) Transmit the analog signal as a differential voltage to provide rejection of common-mode electrical noise that may be capacitively or inductively coupled to cable 14, (3) Use shielded cable to protect the signal conductors from capacitively coupled (electric field) interference, and (4) Use twisted-pair cable to reduce inductively coupled (magnetic field) interference by reducing the net loop area of the signal conductors. In practice, remote microphone unit 12 should be rigidly mounted in close proximity to the sound source being monitored to minimize background acoustical noise pickup. All of the above measures have the effect of reducing the noise floor, and therefore increasing the dynamic range, of the acoustic monitor.

Figure 2:
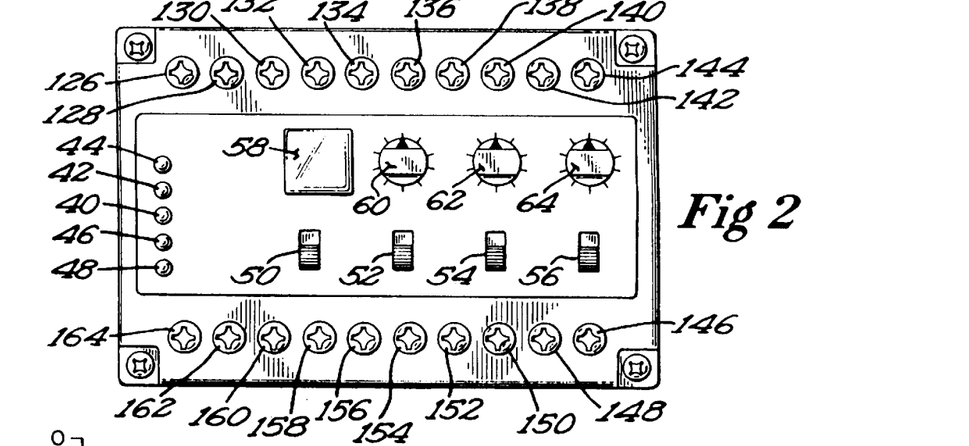
FIG. 2 is an illustration of the front panel of the control unit of the acoustic monitor of FIG. 1 showing indicator lamps, user-operated switches, and screw terminals for user-installed wiring.

The function of relay outputs 30, front panel indicator lamps 32, and front panel switches 34 can best be understood by referring to FIG. 2, which shows the preferred form of a front panel of control unit 10. The acoustic monitor is always in one of the following four possible states: OKAY, WARNING, DANGER, and NOT READY. These states are signaled to external devices, such as annunciator panels or machinery controls, by relay outputs 30 connected to the contacts of three electromechanical relays: a SPDT OKAY relay, a SPDT WARNING relay, and a DPDT DANGER relay. Relay outputs 30 are divided into two groups: five annunciator terminals labeled COMMON, OKAY, WARNING, DANGER, and NOT READY; and three control terminals labeled COMMON, NORMALLY OPEN (N.O.), and NORMALLY CLOSED (N.C.). Only one of the relays is actuated at a time, and the contacts are wired such that the annunciator COMMON terminal makes contact with the OKAY, WARNING, DANGER, or NOT READY terminal to signal the state of control unit 10. In addition, the control COMMON terminal makes contact with the control N.O. terminal whenever control unit 10 is in the DANGER state; otherwise, it makes contact with the control N.C. terminal. This feature enables automatic shutdown of the sound source being monitored if the acoustic monitor detects a dangerous condition.

Front panel indicator lamps 32, shown collectively in FIG. 1, are shown individually in FIG.2. In the most preferred form, lamps 32 include green OKAY lamp 40, yellow WARNING lamp 42, and red DANGER lamp 44 which are turned on whenever the corresponding OKAY, WARNING, or DANGER relay is energized. If none of these lamps is turned on, control unit 10 is in the NOT READY state. Orange LEARN lamp 46 is turned on whenever control unit 10 is in the learn mode. Red FAULT lamp 48 flashes to indicate that the operator must wait, or that the operator has made an error. FAULT lamp 48 is continuously lighted whenever control unit 10 detects a hardware or software error. Control unit 10 tests itself at power-up and continuously during operation.

Front panel switches 34, shown collectively in FIG. 1, are shown in greater detail in FIG.2. In the most preferred form, switches 34 include a POWER switch 50 which turns the 5 volt power supply on and off; a MODE switch 52 which selects either the learn or operate mode; ALARM FUNCTION switches 54 and 56 which select either latching or non-latching operation of the warning and danger alarms, respectively; and a CLEAR button 58 which clears a latched alarm condition, erases an existing acoustic signature, or selects a different acoustic signature, depending on the settings of the other switches and the length of time CLEAR button 58 is held down. Switches 60, 62, and 64 are 10-position rotary selector switches. RESPONSE TIME selector switch 60, calibrated in seconds, controls the length of time it takes for the digital averaging filters to respond to a sudden change in acoustic power. WARNING LEVEL selector switch 62, calibrated in decibels, controls the sensitivity of the warning alarm. DANGER LEVEL selector switch 64, also calibrated in decibels, controls the sensitivity of the danger alarm. Adjustable filter response time and alarm sensitivity are essential to ensure that operating condition faults are reliably detected and false alarms are minimized.

Analog and digital signal flow through the acoustic monitor begins at the sound source, such as where vibrating machine elements cause pressure variations to propagate through the surrounding air until they reach microphone unit 12, where they are converted to a corresponding variation in voltage by microphone 36, amplified and converted to differential form by analog signal conditioning circuitry 38, transmitted over cable 14 to control unit 10, filtered by a lowpass anti-aliasing filter, sampled at regular intervals and converted to digital form by analog-to-digital converter 24, and then conveyed to the serial port of digital signal processor 18 for spectral analysis by means of a bank of 96 digital bandpass filters.

Digital filtering in digital signal processor 18 is accomplished by three types of infinite impulse response (IIR) filters, implemented in software using 16-bit fixed-point arithmetic: (1) Twelve sixth-order $\frac{1}{12}$th octave Butterworth bandpass filters, (2) One eighth-order inverse Chebyshev lowpass filter, and (3) One first-order adjustable time constant averaging filter. The sixth-order Butterworth bandpass filters are implemented by cascading three second-order sections, with each section being computed using the following difference equations:

$y(n)=B_0x(n)+w_1(n-1)$ $w_1(n)=A_1y(n)+w_2(n1)$ $w_2(n)=A_2y(n)-B_0x(n)$

Similarly, the eighth-order inverse Chebyshev lowpass filter is implemented by cascading four second-order sections, with each section being computed from the following difference equations:

$y(n)=B_0x(n)+w_1(n-1)$ $w_1(n)=B_1x(n)+A_1y(n)+w_2(n-1)$ $w_2(n)=B_0x(n)+A_2y(n)$

In the above difference equations, the symbols are defined as follows:

$x(n)$=Filter Input $y(n)$=Filter Output $w_1(n),w_2(n)$=Storage Elements $w_1(n-1),w_2(n-1)$=Previous Storage Elements $A_1,A_2,B_0,B_1$=Filter Coefficients (Constants)

The filter coefficients which appear in the foregoing difference equations were computed using a commercially available software package intended for digital filter design, analysis, and simulation. Several such software packages are on the market, and the utility and use of such software will be familiar to those who are skilled in the art.

The magnitude response of the digital filter, as a function of frequency expressed in hertz, depends on the sample rate of the data which is being processed by the filter. It is customary in the field of acoustics to work with a logarithmic frequency scale based on the octave, which denotes a frequency ratio of 2:1. Filters which operate in the highest frequency octave analyzed by digital signal processor 18, known as the top octave, process samples received directly from analog-to-digital converter 24. For the top octave, the sample rate is equal to the output word rate of the A/D converter. To obtain the data for the next lower octave, the top octave samples first pass through a digital anti-aliasing filter (eighth-order inverse Chebyshev lowpass filter). Then, using a process known as decimation, the sample rate is halved by discarding every other output sample. The decimated samples are then processed by the same $\frac{1}{12}$th octave bandpass filters used in the top octave. The digital anti-aliasing filter prevents high frequency components from being folded into the frequency range covered by the bandpass filters when the sample stream is decimated. This process of lowpass filtering, decimation, and bandpass filtering is repeated until eight octaves have been analyzed. It can then be appreciated that it is not necessary to employ 96 distinct bandpass filters to provide $\frac{1}{12}$th octave bandpass filtering over an eight octave range. Only twelve bandpass filters and one lowpass anti-aliasing filter are required because the filters are identical for each octave; only the sample rate changes.

In order to perform filtering in real time, over an eight octave range, digital signal processor 18 must process and store data for each octave in the proper sequence, while new samples are continually received from analog-to-digital converter 24. This is accomplished with eight filter/decimator stages which operate in a continuous loop, performing bandpass filtering for octaves 0 through 7, where octave 0 is the lowest frequency octave and octave 7 is the top octave. The first stage receives data from A/D converter 24, performs the octave 7 bandpass filtering, and produces band-limited input data for the second stage at a sample rate which is one-half the output word rate of the A/D converter. The second stage receives data from the first stage, performs the octave 6 bandpass filtering, and produces band-limited input data for the third stage at a sample rate which is one-fourth the output word rate of the A/D converter, and so on through the eighth stage of filtering and decimation, which receives data from the seventh stage at $\frac{1}{128}$th the output word rate of the A/D converter, and performs the octave 0 bandpass filtering (the decimated samples from the eighth filter/decimator stage are discarded).

Analog-to-digital converter 24 continuously samples the differential analog signal received from remote microphone unit 12 and converts the samples to signed (twos-complement) 16-bit data words. Each time the serial port of digital signal processor 18 receives a data word from A/D converter 24, an interrupt is generated. All of the digital filtering performed by digital signal processor 18 occurs in the interrupt service routine associated with the serial port receive interrupt. Octave 7 data must be processed every time a data word is received by the serial port. Data for one additional octave must also be processed during the same interrupt, except for the last interrupt of every 128-interrupt cycle. The filter/decimator sequence, that is, the order in which octaves 0 through 6 must be processed, is stored in a look-up table in the program memory of digital signal processor 18, and is as follows:

6,5,6,4,6,5,6,3,6,5,6,4,6,5,6,2,6,5,6,4,6,5,6,3,6,5,6,4,6,5,6,1, 6,5,6,4, 6,5,6,3,6,5,6,4,6,5,6,2,6,5,6,4,6,5,6,3,6,5,6,4,6,5,6,0, 6,5,6,4,6,5, 6,3,6,5,6,4,6,5,6,2,6,5,6,4,6,5,6,3,6,5,6,4,6,5,6,1, 6,5,6,4,6,5,6,3, 6,5,6,4,6,5,6,2,6,5,6,4,6,5,6,3,6,5,6,4,6,5,6,

As can be seen from the above sequence, data for each octave is processed with the following frequencies:

Octave 7—Every interrupt

Octave 6—Every 2nd interrupt

Octave 5—Every 4th interrupt

Octave 4—Every 8th interrupt

Octave 3—Every 16th interrupt

Octave 2—Every 32nd interrupt

Octave 1—Every 64th interrupt

Octave 0—Every 128th interrupt

The desired output from the digital filter analyzer just described is the time-averaged acoustic power output of each one of the 96 bandpass filters. To obtain this information, the output of each bandpass filter is first squared and then processed by a first-order averaging filter, implemented as follows:

$$y(n)=y(n-1)+K[x(n)-y(n-1)]$$

where the constant K depends on the position of RESPONSE TIME selector switch 60, and the octave which is being filtered. To a close approximation, K is equal to t/tau, where t is the sampling interval and tau is the time constant of the filter, both expressed in seconds. In the above equation, x(n) is the filter input, y(n) is the filter output, and y(n−1) is the previous filter output.

Digital signal processor 18 further processes the 96 double-precision (32-bit) outputs from the foregoing averaging filter to obtain acoustic power on a logarithmic (decibel) scale for each one of the 96 filter bands required. It is customary to express acoustic power on a decibel (dB) scale because of the tremendous dynamic range of the human auditory system (120 dB). Due to the binary nature of digital signal processor 18, it is convenient to compute the base 2 logarithm of the filter output, rather than the customary natural (base e) or common (base 10) logarithms. Furthermore, digital signal processor 18 is optimized for performing calculations on numbers which are in a 16-bit signed (twos-complement) fractional format consisting of one sign bit (the most significant bit) followed by fifteen fractional bits. After squaring the bandpass filter output and smoothing the result with the averaging filter, the resulting time-averaged acoustic power is expressed as a 32-bit fractional number which is always positive. Therefore, on a logarithmic scale, the power output of each bandpass filter varies from a full-scale level of 0 dB (in the limiting case) down to the noise floor of the system, typically about −72 dB. The numerical representation of acoustic power in digital signal processor 18 is not absolute, in the sense that it does not represent a physical measurement having specific dimensions. A relative measure of acoustic power is all that is required for the purposes of the acoustic monitor according to the teachings of the present invention because it is the change in the power spectrum of sound emitted from the sound source that is indicative of failure, not the absolute spectrum. Comparing the real-time power spectrum with the baseline spectrum (the acoustic signature) is straightforward because, during the operate mode, the analog and digital signal path is the same as it was during the learn mode, hen the baseline spectrum was recorded. Thus, unit-to-unit variations in system gain and frequency response are canceled out.

Figure 3:
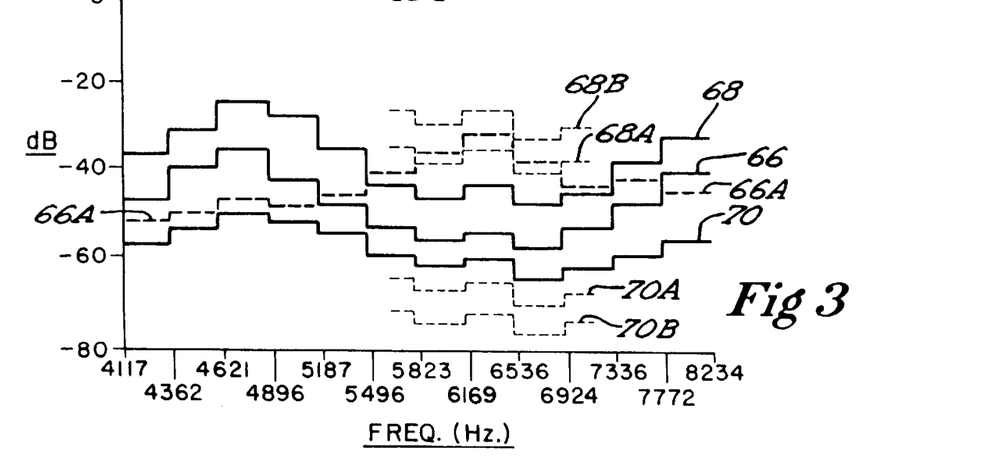
FIG. 3 is a graph showing the upper and lower decibel limits of the acoustic signature, the warning alarm limits, the danger alarm limits, and the real-time power spectrum of sound emitted from a sound source during the operate mode.

The operation of the oscilloscope data viewing feature is best explained by referring to FIG. 3, which shows the real-time power spectrum 66 of the monitored sound source, and the stored acoustic signature, consisting of an upper decibel limit 68 and a lower decibel limit 70. FIG. 3 is a graph showing essentially a magnified view of the screen of optional (multi-channel) oscilloscope 28 of FIG. 1 when channels A, B, and C of quad digital-to-analog converter 26 are displayed simultaneously, while triggering oscilloscope 28 externally using the trigger signal from channel D. On the oscilloscope screen, the vertical scale is calibrated in decibels (20 dB/div) and covers a range from −80 dB to 0 dB. The horizontal scale is calibrated in $\frac{1}{12}$th octave bands (10 bands/div) over an eight octave range (9.6 divisions). The real-time acoustic power 66, the upper dB limit 68, and the lower dB limit 70, for each filter band, appear as horizontal steps on a 96-step graphical display. In FIG. 3, twelve steps are shown for the top-octave filter bands, the other seven octaves having a similar appearance. The numbers on the x-axis (log frequency) represent the band edge frequencies, in Hertz, of the top-octave bandpass filters. The numbers on the y-axis (log power) represent the relative acoustic power output, in decibels, of the top-octave bandpass filters.

The operation of the warning and danger alarms can be understood by again referring to FIG. 3, where a portion of upper decibel limit 68 has been displaced upward by an amount equal to the setting of WARNING LEVEL selector switch 62 to create upper warning limit 68A, and lower decibel limit 70 has been displaced downward by an equal amount to create lower warning limit 70A. In a similar manner, a portion of upper decibel limit 68 has been displaced upward by an amount equal to the setting of DANGER LEVEL selector switch 64 to create upper danger limit 68B, and lower decibel limit 70 has been displaced downward by an equal amount to create lower danger limit 70B. Upper decibel limit 68 and lower decibel limit 70 constitute the acoustic signature of the monitored sound source, and represent the range of acoustic power output observed during the learn mode for each one of the 96 bandpass filters. Thus, it can be seen that warning alarm limits 68A and 70A define an error band for the warning alarm, with the sensitivity being controlled by WARNING LEVEL selector switch 62, and that danger alarm limits 68B and 70B define an error band for the danger alarm, with the sensitivity being controlled by DANGER LEVEL selector switch 64. For example, real-time power spectrum 66 falls within warning alarm limits 68A and 70A, so no alarm is generated; however, real-time power spectrum 66A falls outside warning alarm limit 68A, so the warning alarm is activated.

Figure 4:
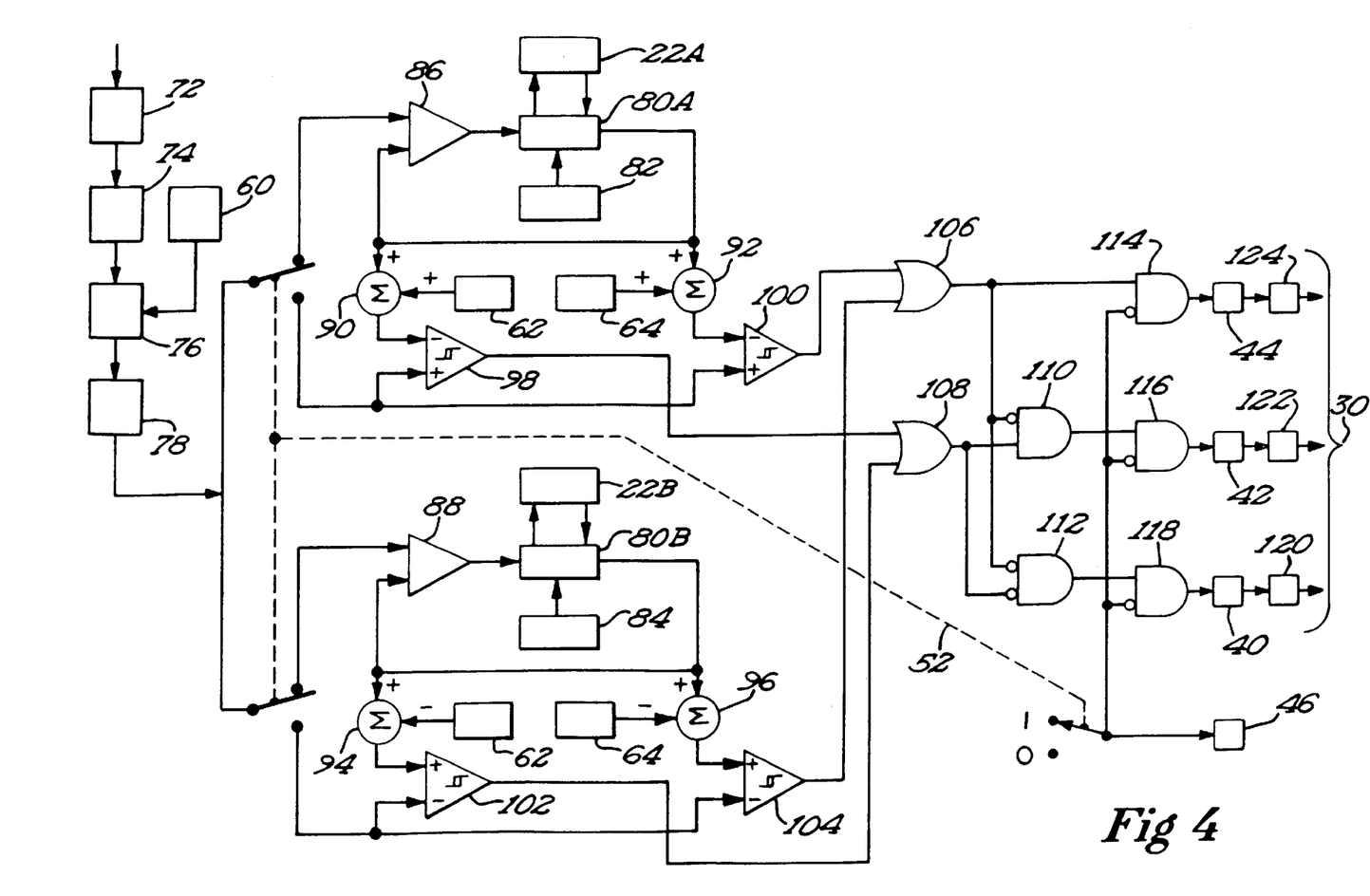
FIG. 4 is a digital signal-flow diagram which illustrates the operation of the learn and operate modes of the acoustic monitor of FIG. 1 by tracing the route taken by digital samples as they move from the bandpass filter outputs, through the various stages of arithmetic processing, comparison, storage, and retrieval, before actuating the front panel indicator lamps and relay outputs.

The operation of the learn and operate modes, as well as the warning and danger alarms, is further understood by referring to the digital signal-flow diagram of FIG. 4. This diagram shows the flow of digital samples for one of the 96 filter bands and is presented in the form of an electrical schematic, even though all of the operations depicted in this diagram are implemented in software by digital signal processor 18. For each filter band, samples for the appropriate octave are first processed by sixth-order ⅟₁₂th octave Butterworth bandpass filter 72, squared by squarer 74, smoothed by first-order averaging filter 76, and then converted to a decibel representation by binary (base 2) logarithm converter 78. The response time, and therefore the time constant, of first-order averaging filter 76 is controlled by RESPONSE TIME selector switch 60. The output of logarithm converter 78 is proportional to the time-averaged acoustic power output, in decibels, of bandpass filter 72. At this point, the signal path is determined by MODE switch 52, which selects either the learn mode (upper position) or the operate mode (lower position). In the learn mode, the output of logarithm converter 78 is continuously compared, on a sample-by-sample basis, with the acoustic signature residing in random access memory (RAM) 80 of digital signal processor 18. The upper decibel limits, read from memory 80A, are processed in the upper portion of the signal-flow diagram. The lower decibel limits, read from memory 80B, are processed in the lower portion of the signal-flow diagram. If already existing in non-volatile memory (NVM) 22, a valid acoustic signature is loaded into RAM 80 by digital signal processor 18 during the operate mode, before entering the learn mode. In this case, the learn mode will expand the upper and lower decibel limits of the existing acoustic signature. If there is no existing acoustic signature in NVM 22, the upper decibel limits are initialized in memory 80A by initial conditions 82 and the lower decibel limits are initialized in memory 80B by initial conditions 84. Initial conditions 82 correspond to the minimum acoustic power (−80 dB) and initial conditions 84 correspond to the maximum acoustic power (0 dB). The upper decibel limits are determined by comparator 86, working in a loop with memory 80A. Each time a sample is received from logarithm converter 78, the sample is compared by comparator 86 with the corresponding upper decibel limit read from memory 80A. If the sample is greater than the limit, comparator 86 overwrites the existing limit with the value of the sample, thus establishing a new upper decibel limit in memory 80A for the filter band in question. In a similar manner, the lower decibel limits are determined by comparator 88, working in a loop with memory 80B. If the sample received from logarithm converter 78 is less than the corresponding lower decibel limit read from memory 80B, comparator 88 overwrites the existing limit with the value of the sample, thus establishing a new lower decibel limit in memory 80B for the filter band in question. This process continues for as long as MODE switch 52 is in the learn position. During the learn mode, the acoustic signature stored in RAM 80 is written to NVM 22 every ten minutes, and again when MODE switch 52 is moved from the learn position to the operate position.

When MODE switch 52 is in the operate position, the sample stream is directed from the output of logarithm converter 78 to the non-inverting inputs of comparators 98 and 100 and to the inverting inputs of comparators 102 and 104. Comparators 98, 100, 102, and 104 employ hysteresis to prevent oscillation when the output logic state changes. The reference level for comparator 98 is the sum of the WARNING LEVEL set by selector switch 62 and the corresponding upper decibel limit read from memory 80A, computed by summing unit 90. Comparator 98 turns on (outputs a logic 1) when the level at the non-inverting input reaches the reference level, and turns off (outputs a logic 0) when the level at the non-inverting input drops to a value equivalent to the arithmetic average of the upper decibel limit and the reference level. The reference level for comparator 100 is the sum of the DANGER LEVEL set by selector switch 64 and the corresponding upper decibel limit read from memory 80A, computed by summing unit 92. Comparator 100 turns on when the level at the non-inverting input reaches the reference level, and turns off when the level at the non-inverting input drops to a value equivalent to the arithmetic average of the warning and danger reference levels. The reference level for comparator 102 is equal to the lower decibel limit read from memory 80B minus the WARNING LEVEL set by selector switch 62, computed by subtraction unit 94. Comparator 102 turns on when the level at the inverting input drops below the reference level, and turns off when the level at the inverting input rises above a value equivalent to the arithmetic average of the lower decibel limit and the reference level. The reference level for comparator 104 is equal to the lower decibel limit read from memory 80B minus the DANGER LEVEL set by selector switch 64, computed by subtraction unit 96. Comparator 104 turns on when the level at the inverting input drops below the reference level, and turns off when the level at the inverting input rises above a value equivalent to the 1arithmetic average of the warning and danger reference levels.

The outputs of comparators 98 and 102 are connected to the inputs of OR gate 108. Therefore, the output of OR gate 108 will be a logic 1 whenever the real-time acoustic power output of any of the 96 bandpass filters deviates from the upper or lower decibel limits of the acoustic signature by an amount greater than the setting of WARNING LEVEL selector switch 62. The output of OR gate 108 will remain at a logic until the maximum power deviation drops below one-half the setting of WARNING LEVEL selector switch 62.

The outputs of comparators 100 and 104 are connected to the inputs of OR gate 106. Therefore, the output of OR gate 106 will be a logic 1 whenever the real-time acoustic power output of any of the 96 bandpass filters deviates from the upper or lower decibel limits of the acoustic signature by an amount greater than the setting of DANGER LEVEL selector switch 64. The output of OR gate 106 will remain at a logic until the maximum power deviation drops below the arithmetic average of the settings of WARNING LEVEL selector switch 62 and DANGER LEVEL selector switch 64.

In the preferred form, digital signal processor 18 is programmed to flash red FAULT lamp 48 continuously at a 1 Hertz rate and suspend normal operation of the acoustic monitor, unless the setting of DANGER LEVEL selector switch 64 is greater than the setting of WARNING LEVEL selector switch 62. Therefore, if the output of OR gate 106 is a logic 1, the output of OR gate 108 will also be a logic 1. The output of OR gate 108 is gated by AND gate 110 in such a manner that the output of AND gate 110 cannot equal a logic unless the output of OR gate 106 is a logic 0. The output of AND gate 112, with inverted inputs, will be equal to a logic 1 only if the outputs of OR gates 106 and 108 are both equal to logic 0. Therefore, the output of AND gate 112 will be a logic 1 if control unit 10 is in the OKAY state, the output of AND gate 110 will be a logic 1 in the WARNING state, and the output of OR gate 106 will be a logic 1 in the DANGER state. Only one of these three outputs can be a logic 1, since control unit 10 can only be in one state at a time. These logic signals are further gated by AND gates 114, 116, and 118 in such a manner that the outputs of AND gates 114, 116, and 118 cannot equal logic 1, unless MODE switch 52 is in the operate position. When the output of AND gate 118 is a logic 1, green OKAY lamp 40 is turned on and OKAY relay 120 is actuated. When the output of AND gate 116 is a logic 1, yellow WARNING lamp 42 is turned on and WARNING relay 122 is actuated. When the output of AND gate 114 is a logic 1, red DANGER lamp 44 is turned on and DANGER relay 124 is actuated. When MODE switch 52 is in the learn position, front panel indicator lamps 40, 42, and 44 are turned off, relays 120, 122, and 124 are deactivated, and orange LEARN lamp 46 is turned on.

Relay outputs 30, shown collectively in FIG. 1 and FIG. 4, are shown individually in FIG. 2, along with the other recessed screw terminals intended for user-installed wiring. Terminals 126 (Line) and 128 (Neutral) are the AC power input connections. A line voltage select switch for selecting either the 115 or 230 VAC nominal line voltage is on the rear panel of control unit 10. In the preferred form, relay outputs 30 include five annunciator terminals 130, 132, 134, 136, and 138, labeled Okay, Common, Warning, Not Ready, and Danger, respectively. Relay outputs 30 in the preferred form further include three control terminals 140, 142, and 144, labeled N.O. (Normally Open), Common, and N.C. (Normally Closed), respectively. Terminal 146 is the Earth (Protective) Ground. Optional oscilloscope 28 is connected to terminals 148, 150, 152, and 154, labeled Power Spectrum, Upper dB Limits, Lower dB Limits, and Scope Trigger, respectively. Terminal 156, labeled Clear, accepts a 5–30 volt DC signal and performs the same function as front panel CLEAR button 58. Four-conductor shielded cable 14, coming from remote microphone unit 12, connects to terminals 158, 160, 162, and 164, labeled Analog +5V, Analog round, Microphone (−), and Microphone (+), respectively. The ground lead of optional oscilloscope 28 is connected to analog ground terminal 160, the quietest ground point on control unit 10, as is the drain wire of cable 14.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. An electronic monitor that monitors sound produced by a sound source and that detects abnormalities and operating conditions thereof, comprising:

a microphone located in proximity to the sound source that detects sound emanating from the sound source and generates an analog electrical signal representative of the sound within an audible frequency range over a plurality of octaves;

an analog signal conditioning circuit coupled to the microphone that conditions the analog electrical signal from the microphone and converts it to a differential analog signal;

an analog-to-digital converter that samples the differential analog signal at regular intervals and that converts it to a stream of digital samples;

a digital filter coupled to the analog-to-digital converter that processes the stream of digital samples from the analog-to-digital converter continuously and in real time using a plurality of fractional octave digital bandpass filters to obtain a real-time acoustic power spectrum of the sound, the real-time acoustic power spectrum of the sound comprising a plurality of time-average acoustic power outputs from the plurality of fractional octave digital bandpass filters;

the monitor having a learning mode and an operating mode such that an acoustic signature copy of the real-time acoustic power spectrum of the sound is produced in the learning mode and such that test copies of the real-time acoustic power spectrum of the sound are continuously generated during the operating mode;

a memory that receives and stores the acoustic signature copy of the real-time acoustic power spectrum of the sound when the monitor is in the learning mode; and a comparitor that compares the acoustic signature copy of the real-time acoustic power spectrum of the sound with the test copies of the real-time acoustic power spectrum of the sound, the comparison further comprising a comparison of each of the plurality of time-average acoustic power outputs from the plurality of fractional octave digital bandpass filters, and the monitor generating a warning signal when the comparison indicates that any of the test copies are not within an acceptable range of the signature copy.

2. The electronic monitor of claim 1 wherein the digital filter further comprises a filter-decimater loop that repeatedly low pass filters and decimates data from each octave of the sound to obtain input data for the next lower octave.

3. The electronic monitor of claim 1 further comprising an anti-aliasing low pass filter that attenuates undesired high frequency components in the differential analog signal.

4. The electronic monitor of claim 1 further comprising an enclosure for housing the microphone and analog signal conditioning circuit in a remote location, the enclosure being of rugged construction suitable for use in an industrial environment.

5. The electronic monitor of claim 3 further comprising a cable consisting of two individually-shielded twisted pairs with common drain wire, one pair being a power pair which supplies the microphone and analog signal conditioning circuit with DC power and the other pair being a signal pair that conveys the differential analog signal from the analog signal conditioning circuit to the anti-aliasing low pass filter.

6. The electronic monitor of claim 1 wherein each of the plurality of fractional octave digital bandpass filters correspond to and filter digital samples from the plurality of octaves and each fractional octave digital bandpass filter uses a sample rate that differs by a factor of two between each adjacent octave.

7. The electronic monitor of claim 1 wherein the digital filter squares the output of each fractional octave digital bandpass filter and averages the result with a first-order averaging filter having an adjustable time constant to obtain the time-averaged acoustic power output of each bandpass filter.

8. The electronic monitor of claim 1 wherein during the learn mode, a maximum and minimum limit for the time-average acoustic power output from each of the fractional octave digital bandpass filters are continuously maintained and updated in the memory as the acoustic signature copt of the sound source.

9. The electronic monitor of claim 8 wherein during the operating mode the monitor continuously compares each of the time-average acoustic power outputs with the corresponding acoustic signature copy stored during the learn mode and generates the warning signal when any one of the fractional octave digital bandpass filters deviates from upper or lower limits of the acoustic signature.

10. The electronic monitor of claim wherein the warning signal comprises two alarm signal levels, a first alarm signal level indicating a developing problem and a second alarm signal level indicating a situation requiring immediate corrective action.

11. The electronic monitor of claim 1 further comprising front panel switches that control the operation of the monitor, including a mode switch for selecting between either the learning mode or the operate mode.

12. The electronic monitor of claim 10 further comprising two sensitivity switches for controlling the alarm signal levels.

13. The electronic monitor of claim 7 further comprising a time constant switch for controlling the time constant of the first order averaging filter.

14. The electronic monitor of claim 10 further including front panel indicator lamps that indicate the status of the monitor, including a warning light indicative of the alarm system level.

15. The electronic monitor of claim 1 further including a graphical data viewing apparatus that allows the user to view the time-average acoustic power outputs of each of the plurality of fractional octave digital bandpass filters.

* * * * *

UNITED STATES PATENT AND TRADEMARK OFFICE
CERTIFICATE OF CORRECTION

PATENT NO. : 6,507,790 B1
DATED : January 14, 2003
INVENTOR(S) : James V. Radomski It is certified that error appears in the above-identified patent and that said Letters Patent is hereby corrected as shown below:

Column 5,
Line 44, delete "is"

Column 7,
Line 33, delete "words×16" and insert -- words × 16 --

Column 10,
Line 12, delete "(n1)" and insert -- (n-1) --
Line 34, delete "$A_1,A_{2,B0},B_1$" and insert -- $A_1,A_2,B_0,B_1$ --

Column 12,
Line 39, delete "hen" and insert -- when --

Column 14,
Line 53, delete "1arith-" and insert -- arith --

Column 15,
Lines 5 and 18, after "logic", insert -- 1 --

Signed and Sealed this

Third Day of February, 2004

JON W. DUDAS
*Acting Director of the United States Patent and Trademark Office*